(12) United States Patent
Armstrong et al.

(10) Patent No.: US 8,510,454 B2
(45) Date of Patent: Aug. 13, 2013

(54) MAPPED PARAMETER SETS USING BULK LOADING SYSTEM AND METHOD

(75) Inventors: Brad Armstrong, Minnetonka, MN (US); Peter Huang, Taipei (TW); Daniel John Charbonneau, Chanhassen, MN (US)

(73) Assignee: Digital River, Inc., Minnetonka, MN (US)

( * ) Notice: Subject to any disclaimer, the term of this patent is extended or adjusted under 35 U.S.C. 154(b) by 120 days.

(21) Appl. No.: 11/744,085

(22) Filed: May 3, 2007

(65) Prior Publication Data

US 2007/0260705 A1    Nov. 8, 2007

Related U.S. Application Data

(60) Provisional application No. 60/797,542, filed on May 4, 2006.

(51) Int. Cl.
*G06F 15/16*       (2006.01)

(52) U.S. Cl.
USPC ........... 709/229; 709/217; 709/218; 709/223; 709/225

(58) Field of Classification Search
USPC .................................. 709/223–226
See application file for complete search history.

(56) References Cited

U.S. PATENT DOCUMENTS 5,812,776 A     9/1998  Gifford
6,393,477 B1 *  5/2002  Paxhia et al. ................. 709/223
2003/0154406 A1 *  8/2003  Honarvar et al. ............. 713/201
2004/0054671 A1 *  3/2004  Cohen et al. ...................... 707/3
2005/0179650 A1    8/2005  Ludwig
2006/0041635 A1 *  2/2006  Alexander et al. ............ 709/218
2006/0136501 A1    6/2006  Ijomah et al.

OTHER PUBLICATIONS

URL Redirection. Wikipedia, The Free Encyclopedia (online). [retreived on May 3, 2007] Retrieved from the Internet: <http://en.wikipedia.org/wiki/URL_redirector>.
Upselling Wikipedia, The Free Encyclopedia (online). [retrieved on May 3, 2007] Retrieved from the internet: <http://en.wikipedia.org/wiki/Upsell>.

* cited by examiner

*Primary Examiner* — Ian N Moore
*Assistant Examiner* — Jackie Zuniga
(74) *Attorney, Agent, or Firm* — Lynn M. Holly; Richard E. Billion; Shawn B. Dempster

(57) ABSTRACT

A system and method are provided that allows users to define a set of parameters for Uniform Resource Locator (URL) mapping rules. A URL may be defined for each output parameter condition, input parameters inspected, and the output parameter value determined. Business logic is executed before and after URL mappings have been determined. Multiple exclusive groups of mapping rules are maintained and an incoming URL can be explicitly directed to a rule group. Rule handlers, new URLs within an existing link generator, as well as input and output parameters are created to act on parameters during processing. Input parameters and values are translated to output parameters and values, respectively. Output parameters and values are mapped to a destination URL. In addition, a customizable bulk loading tool is provided which sends the mapped sets directly to a client to add values to the sets and then returns the document.

18 Claims, 12 Drawing Sheets

FIG. 4

MAPPED PARAMETER SETS USING BULK LOADING SYSTEM AND METHOD

This application claims the benefit of U.S. Provisional Application No. 60/797,542 filed 4 May 2006, entitled "Derive Logic," which is incorporated herein by reference.

FIELD OF THE INVENTION

The present invention relates to technology for uniform resource locator redirection and rewriting. In particular, it relates to user configurable defined rules via a web-based graphic user interface.

BACKGROUND OF THE INVENTION

Since the dawn of the computer age, computer systems have evolved into extremely sophisticated devices, and computer systems may be found in many different settings. The widespread proliferation of computers prompted the development of computer networks that allows computers to communicate with each other. With the introduction of the personal computer (PC), computing became accessible to large numbers of people. Networks for personal computers were developed that allow individual users to communicate with each other.

One significant computer network that has recently become very popular is the Internet. The Internet grew out of this proliferation of computers and networks, and has evolved into a sophisticated worldwide network of computer system resources commonly known as the World Wide Web (web). A user at an individual PC (i.e., workstation) that wishes to access the Internet typically does so using a software application known as a web browser. A web browser makes a connection via the Internet to other computers known as web servers, and receives information from the web servers that is rendered to the user's workstation. Information transmitted from the web server to the web browser is generally formatted using a specialized language called Hypertext Markup Language (HTML) and is typically organized into pages known as web pages. Other Internet resources exist for transferring information, such as File Transfer Protocol (FTP) and Gopher, but have not achieved the popularity of the web. In the web environment, servers and clients affect data transfer using the Hypertext Transfer Protocol (HTTP), a known protocol for handling the transfer of various data files (e.g., text, still graphic images, audio, motion video, etc.). When capitalized, the term "Internet" refers to the collection of networks and gateways that use the TCP/IP suite or protocols.

It will be understood by one of ordinary skill in the art that the term "computer" or "computational device", as used herein, may refer to any of such device which contains a processor and some type of memory. The networks connecting computational devices may be "wired" networks, formed using lines such as copper wire or fiber optic cable, wireless networks employing earth and/or satellite-based wireless transmission links, or combinations of wired and wireless network portions. Many such networks may be organized using a client/server architecture, in which "server" computational devices manage resources, such as files, peripheral devices, or processing power, which may be requested by "client" computational devices. "Proxy servers" can act on behalf of other machines, such as either clients or servers.

On-line commerce is now an important part of our economy, mainly because of the efficiency and the ready convenience that on-line commerce, or e-commerce, provides. Furthermore, online merchants have discovered the value of selling their goods via the Internet. The term e-commerce is used herein to refer to any commercial activity using computers interconnected by a communication network, e.g., the Internet. Because of the unique characteristics of the Internet, carrying out commercial transactions over the Internet presents new issues and new opportunities.

In order to provide web-based information and services over the internet, the web employs "client" computers, "browser" software, and "server" computers. A client computer is a computer used by an individual to connect to the internet and access web pages. A browser is a software application, located on a client computer, which requests, via the internet, a web page from a server computer. After receiving the web page, the browser displays the web page on the client computer's monitor. A server computer is a computer which stores web page information, retrieves that information in response to a browser's request, and sends the information, via the internet, to the client computer. Thus, after a web page is created, the page must be "posted" to a particular server computer which "hosts" the page, so that the page can be accessed over the internet. In order to have one's web page hosted by a server, the individual must contract with an internet service provider (ISP) associated with the server. This contract specifies, among other things, the duration of the time that the ISP will host the page, and how much the individual will pay for that hosting service.

Additionally, uniform resource locator (URL) redirection, also called URL forwarding, domain redirection and domain forwarding, is a technique on the web for making a web page available under many URLs. There are several reasons for a webmaster to use redirection, such as similar domain names, moving a site to a new domain, logging outgoing links, and using short, meaningful, persistent aliases for long or changing URLs.

Users might search for the same information under slightly different URLs, e.g., www.gooogle.com and www.googel.com. An organization can register these domains and re-direct them to the correct location, such as www.google.com. A web site might change its domain name for several reasons. An author might move his or her pages to a new domain or two sites might merge. With URL redirects, incoming links to the old URL can be directed to the new location. These links might be from other sites that have not realized that there is a change or from bookmarks and favorites that users have saved in their browsers. The same applies to search engines. They have the older domain in their database and will link visitors to the URLs found previously. By using a "moved permanently" redirect to the new URL, visitors will still end at the correct page. Also, in the next crawl, the search engine should detect and use the newer URL.

For logging outgoing links, the access logs of most web servers keep detailed information from where visitors came and how they browsed the hosted site. They do not, however, log which links visitors left by. This is because the visitor's browser has no need to communicate with the original server when the visitor clicks on an out-going link. This information can be captured in several ways. One way involves URL redirection. Instead of sending the visitor straight to the other site, links on the site can direct to a URL on the original website's domain that automatically redirects to the real target. This added request will leave a trace in the server logs saying exactly which link was followed. This technique is also used by some corporate websites to have a "warning" page that the content is off-site and not necessarily affiliated with the corporation.

Currently, web engineers tend to pass descriptive attributes in the URL to represent data hierarchies, command structures, transaction paths and session information. This results in a URL that is aesthetically unpleasant and difficult to remember. Sometimes the URL of a page changes even though the content stays the same. There are several techniques to implement a redirect, such as manual redirect, HTTP status codes, refreshing meta tags and HTTP refresh headers, JavaScript redirects, frame redirects, and redirect loops. Furthermore, there exist services that can perform URL redirection on demand, with no need for technical work or access to the web server a site is hosted on. URL redirection services exist to shorten long URLs.

In URL redirecting, web engineers may utilize techniques such as parameter based rules. A parameter is a variable which can be accepted by a subroutine. The subroutine uses the values assigned to its parameters to alter its behavior at runtime. Most programming languages can define subroutines that accept zero or more parameters. Parameters are also commonly referred to as arguments, though arguments are more properly thought of as the actual values or references assigned to the parameter variables when the subroutine is called at runtime. When discussing code that is calling into a subroutine, any values or references passed into the subroutine are the arguments, and the place in the code where these values or references are given is the parameter list. When discussing the code inside the subroutine definition, the variables in the subroutine's parameter list are the parameters, while the values of the parameters at runtime are the arguments.

Many programmers use parameter and argument interchangeably, depending on context to distinguish the meaning. In practice, distinguishing between the two terms is usually unnecessary in order to use them correctly or communicate their use to other programmers. Alternatively, the equivalent terms formal parameter and actual parameter may be used.

In strongly-typed programming languages that are explicitly typed, each parameter's type is specified in the subroutine's declaration. Languages using type inference attempt to discover the types automatically from the function's body and usage, while weakly-typed programming languages defer type resolution to run-time. Some languages use a special keyword (e.g. void) to indicate that the subroutine has no parameters; in formal type theory, such functions take an empty parameter list (whose type is not void, but rather unit). In addition, the exact mechanism for assigning arguments to parameters, called argument passing, depends upon the evaluation strategy used for that parameter (typically call-by-value), which may be specified using keywords.

Some programming languages allow for a default argument to be explicitly or implicitly given in a subroutine's declaration. This allows the caller to omit that argument when calling the subroutine. If the default argument is explicitly given, then that value is used if it is not provided by the caller. If the default argument is implicit (sometimes by using a keyword such as "Optional") then the language provides a well-known value (such as "null," "empty," "zero," "an empty string," etc.) if a value is not provided by the caller. Furthermore, some languages allow subroutines to be defined to accept a variable number of arguments. For such languages, the subroutines must iterate through the list of arguments. Some programming languages allow subroutines to have named parameters. This allows the calling code to be more self-documenting. It also provides more flexibility to the caller, often allowing the order of the arguments to be changed, or for arguments to be omitted as needed E-commerce companies often utilize up-selling sales practices to increase revenue. Generally, up-selling is where a salesman attempts to have the consumer purchase more expensive items, upgrades, or other add-ons in an attempt to make a better sale. Up-selling usually involves marketing more profitable services or products, but up-selling can also be simply exposing the customer to other options he or she may not have considered previously.

Examples of up-sales are adding side dishes to a food order, selling an extended service contract for an appliance, or selling luxury finishing on a vehicle. A common technique for successful up-sellers is becoming aware of a customer's background and budget, allowing them to better understand what the particular person might need. Many companies teach their employees to up-sell products and services. Or, in a more modern context, a web hosting company may offer domains at a particular price, and then offer additional products during a checkout process. This may include web hosting, privacy options, traffic & search engine promotional tools, etc. Up-selling may be done by redirection of URLs.

A need exists for making the process of URL redirection through parameter sets more streamlined, flexible, and accessible to clients. The present invention provides a solution to these needs and other problems, and offers other advantages over the prior art.

BRIEF SUMMARY OF THE INVENTION

The present invention is related to a software system that solves the above-mentioned problems. In a preferred embodiment, mapped parameter sets allows users to define a set of parameters, called "output parameters", in which the URL mapping rules will be based. This process also allows users to define a full or partial URL for each output parameter condition needed. Users are able to inspect one or more of the incoming parameters called "input parameters", and determine the value of an output parameter.

In addition, users will be allowed to execute business logic before and after URL mappings have been determined. Users will be able to maintain multiple exclusive groups of mapping rules, and to explicitly direct an incoming URL to one of these rule groups. Further, other abilities within the user's scope is to setup and maintain rule groupings, create rule handlers to act on parameters during pre or post processing, create input and output parameters, translate input parameters and values to output parameters and values, map output parameters and values to a destination URL, and create new URLs within an existing link generator. Lastly, mapped parameter sets uses a bulk loading tool which allows a user to send the mapped sets directly to a customer or client and have the customer or client add parameter values, rules, or parameter mappings to the mapped sets and then return the document to the user. This function is accomplished through a download and import aspect of the system.

BRIEF DESCRIPTION OF THE DRAWINGS

FIG. 4 describes a mapped parameter set list.

DETAILED DESCRIPTION

Definitions in Table 1 are intended to clarify terms and concepts used within this document.

TABLE 1

Definitions

| Term | Definition |
| --- | --- |
| Parameter | A property whose value determines - or contributes to the determination of - the characteristics or behavior of an operation or action. |
| Input Parameter | A parameter that will be used to determine the value of a remapped parameter. An input parameter's name must match an incoming request parameter name. |
| Remapped Parameter | A parameter whose value is set based on other parameter values. Remapped parameters are typically also used as output parameters, but they may, instead, be added to final URL rather than contributing to its determination. |
| Output Parameter | A parameter that is used in the final URL mapping table that contributes to the determination of the final URL. |
| Rule | A string of parameters that, if the values correspond to those contained in an incoming URL, remap to new parameter values and direct the browser to a product detail page; a single line on the mapped parameter set spreadsheet. |
| Mapped Parameter Set | A collection of rules. |
| Template Spreadsheet | A spreadsheet that has been formatted, has defined columns representing parameters, and that can be populated with values and uploaded to an ecommerce platform. |
| User | This role could be performed by an internal account manager or staff. This actor will manage mapped parameter sets through the UI, download template spreadsheets, and upload populated spreadsheets. |

Set Up Flow

Figure 1:
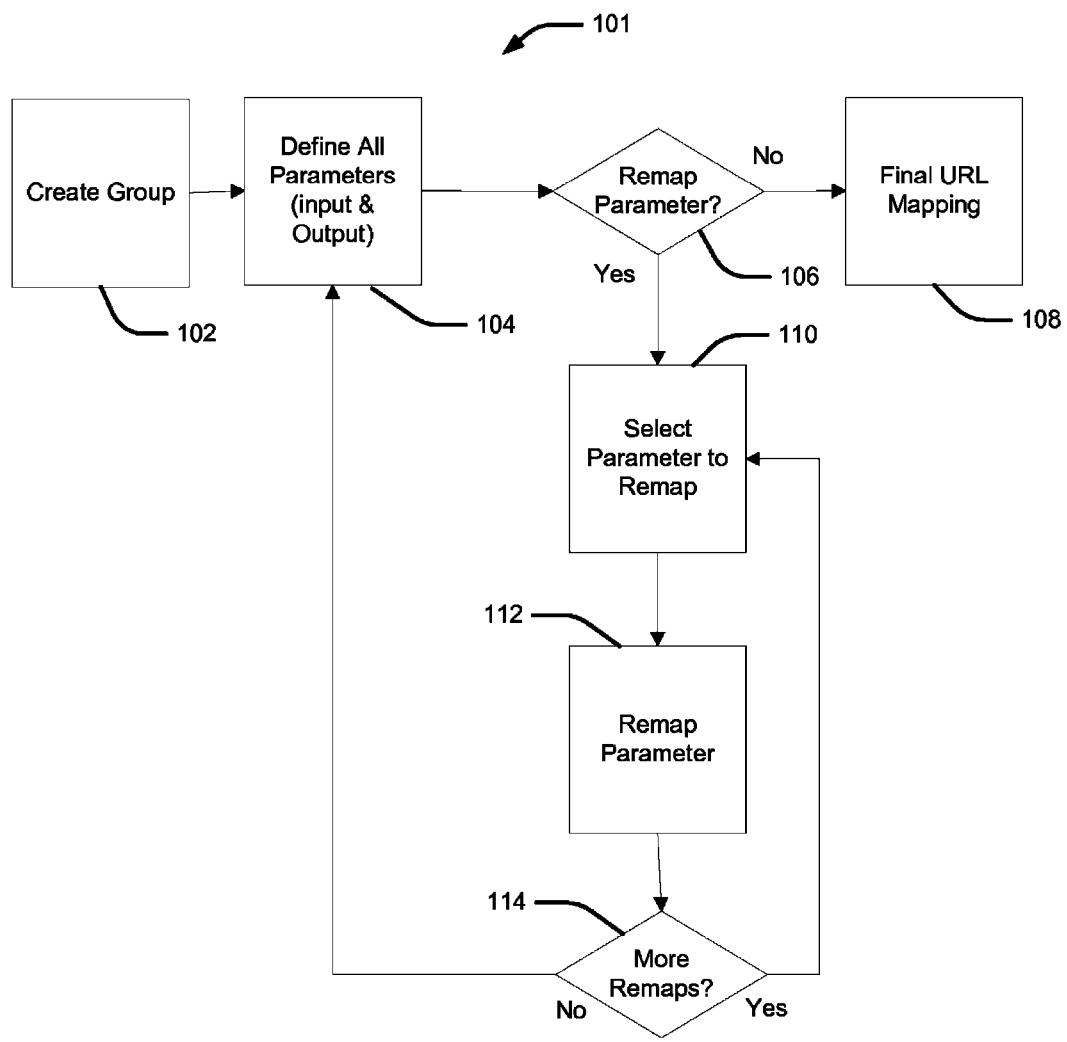
FIG. 1 is a flow chart of preferred embodiment process for building a mapped parameter set.

FIG. 1 shows a simplified setup flow chart 101 of building a mapped parameter set. "Create Group" 102 is the step where the user chooses a new parameter set or rules. "Define All Parameters (Input & Output)" 104 names parameters and identifies whether they are output or remapping parameters. It will be understood by one of ordinary skill in the art that output is mapping a parameter to a URL. Remapping is changing the value of one parameter based on another parameter. Next, "Remap Parameter?" 106 is a decision step. If "No," then the user reaches "Final URL Mapping" 108 step. If "Yes," then the user moves to "Select Parameter to Remap" 110 step where they select a particular parameter to remap. "Remap parameter" 112 is another step to confirm remapping. Finally, the user decides in step "More Remaps?" 114 to remap further parameters or move back to "Define All Parameters (Input & Output)" 104. It is important to note that FIG. 1 does not describe a bulk loading system (described infra) for sake of simplicity.

Figure 2:
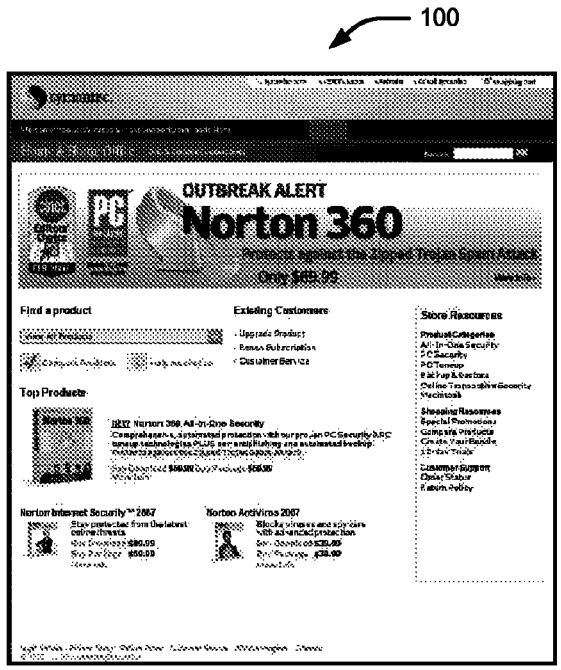
FIG. 2 shows a resulting page from an example URL in a preferred embodiment of mapped parameter sets.

An example of a resulting page 100 from a redirect URL is shown in FIG. 2. A user is redirected to the appropriate up sell product detail page. The user may be a customer, a client, or an administrator. It will be understood by one of ordinary skill in the art that the user role is not limited to the names listed. An example URL may be:

http://www.symantecstore.com/dr/v2/ec_routing derive?DeriveGroup=SymantecConsole&catid=4&requester=051122194438&osver=5.1.2.0&Locale= USA&Language=EN&spefsku=10433521&spskup=& spskum=10439590&v=1&VendorID=003&VendorServiceTag=0.

It will be understood by one of ordinary skill in the art that FIG. 2 shows an example of a page that results when the user clicks on a link to a redirected URL. Thus, the page could be virtually anything the user wishes the link to redirect towards. FIG. 2 is not part of the set up of mapped parameter sets; it is only an example output URL.

Figure 3:
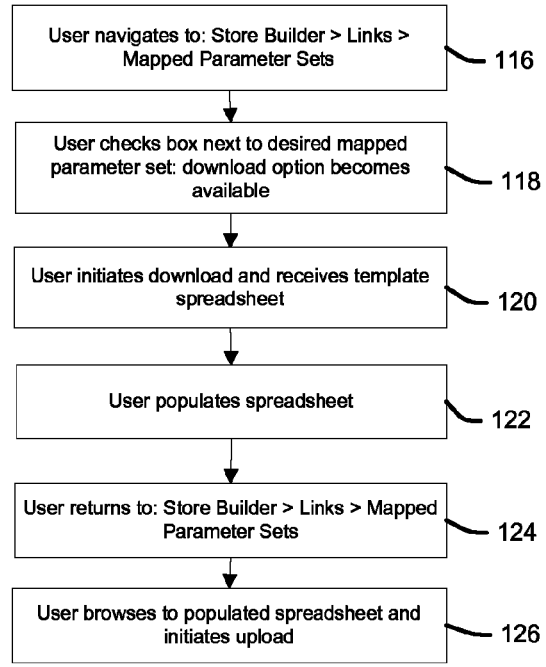
FIG. 3 outlines a flow diagram for the bulk loading portion of mapped parameter sets system and method.

FIG. 3 outlines a flow diagram for the bulk loading system of mapped parameter sets system and method. It will be understood by one of ordinary skill in the art that this is an example of how a bulk loading system may be incorporated with a mapped parameter set system. Templates are listed in order of precedence, and may be moved up or down depending on how the order is defined in a user interface (UI). First, the user may navigate 116 to a mapped parameter set system. Next, the user may check 118 a box next to the desired mapped parameter set. The user may choose a download option at this point. The user may then download 120 and receives a template spreadsheet. The spreadsheet will contain previous values that have been entered. Next, the user populates 122 the spreadsheet and returns 124 to the original mapped parameter set system. Finally, the user uploads 126 the spreadsheet back onto the system.

Figure 4:
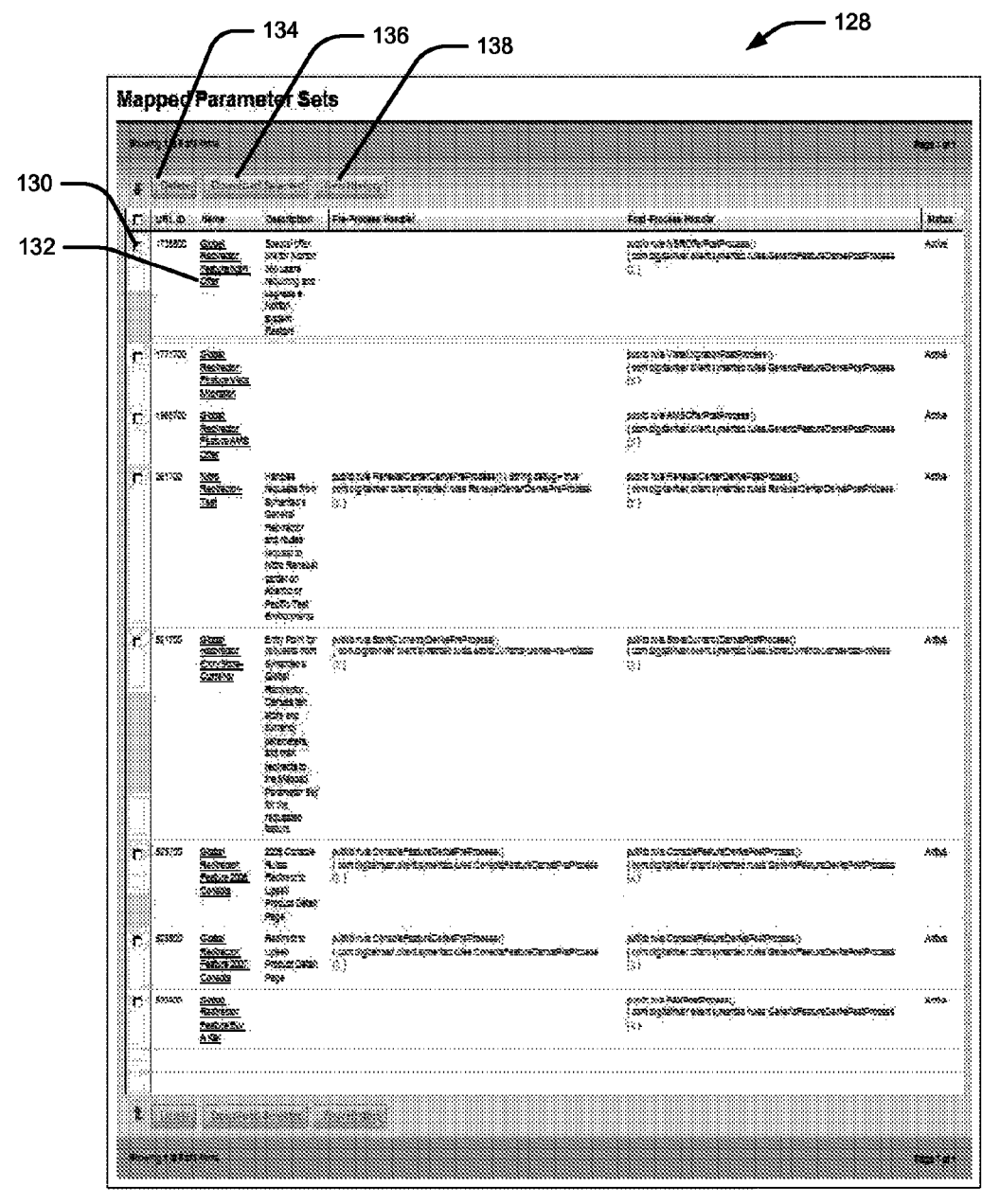

FIG. 4 describes a mapped parameter set list 128. The user may reach this page from navigating 116 (See FIG. 3) to a mapped parameter set system. To edit an existing set 132, the user can click on the name of a set they wish to edit in the list 128. Or, the user may check a box 130 and then delete 134, download 136, or view history 138 of a set.

Figure 5:
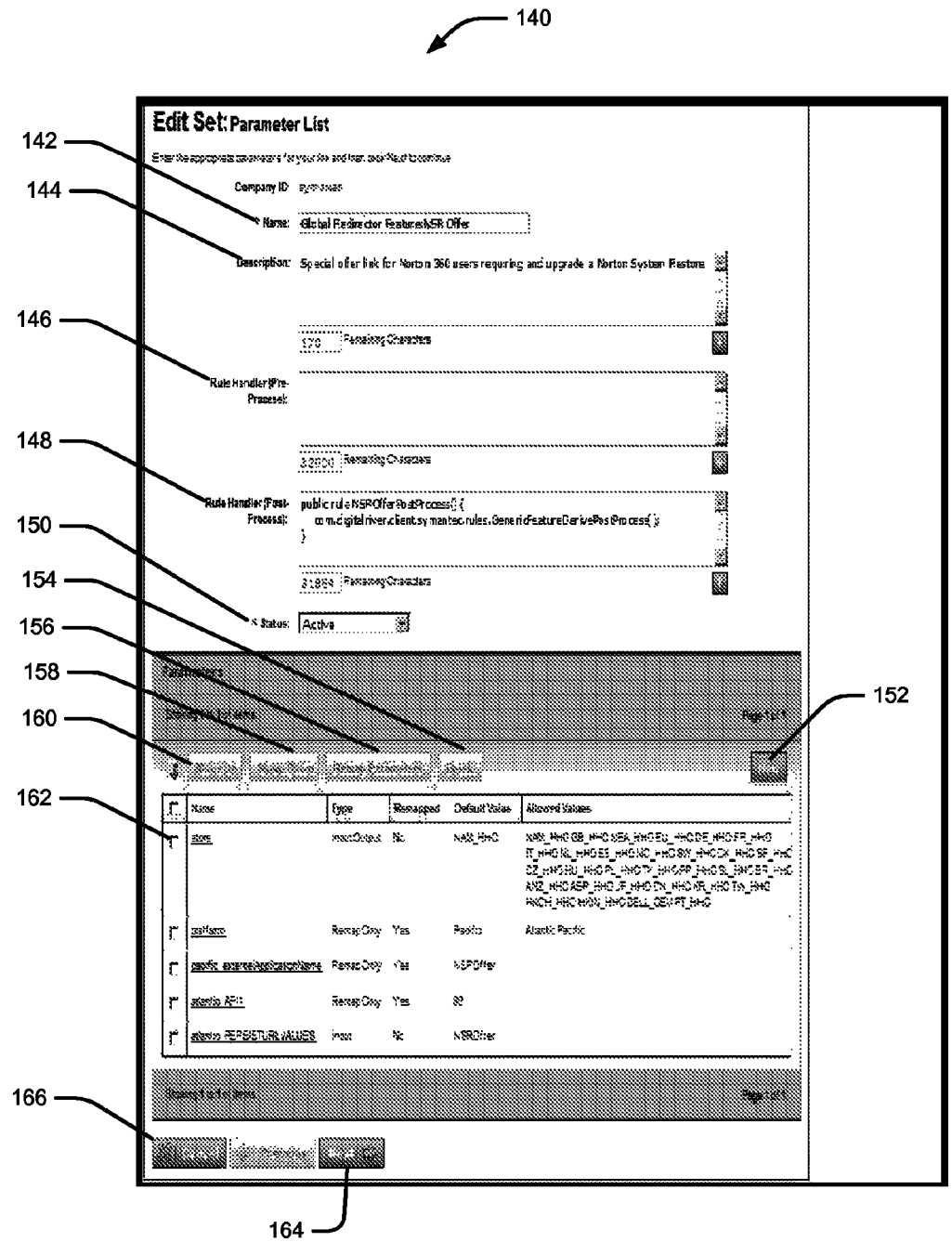
FIG. 5 illustrates an edit set page.

Referring now to FIG. 5, an edit set page 140 page is shown. This is a general page concerning a parameter set, not individual parameters or rules. Thus the fields on this page are specific to an entire set. In another preferred embodiment, the user can add parameters to a set by entering a name 142, description 144, rule handler pre process 146, rule handler post process 148, and a status 150. In the rule handler pre process 146 and post process 148, java code can be inserted in order to do specialized logic before and after the parameters are run. For example, there may be a pre-process rule that looks at several parameters and formulates one of the parameters as "sku." Therefore the mappings just handle a parameter called "sku." The post processing rule can add logic that takes the final derived output URL and appends all parameters that entered on an initial URL.

Still referring to FIG. 5, the user may check a box 162 to select an existing parameter. The move up 160 and move down 158 buttons are to configure weight based selections or scoring of parameters. A remap parameter 156 button will send the checked parameter to a remapping page (See infra). A delete 154 button will remove a checked parameter, and a new 152 button will send the user to a create parameter page (See infra). Conversely, clicking on a name of a parameter will also send the user to an edit parameter page. Once the user has entered information into the edit set page 140, they may click next 164 to go onto the next step of the process. Clicking cancel 166 will abandon all changes on this page.

Figure 6:
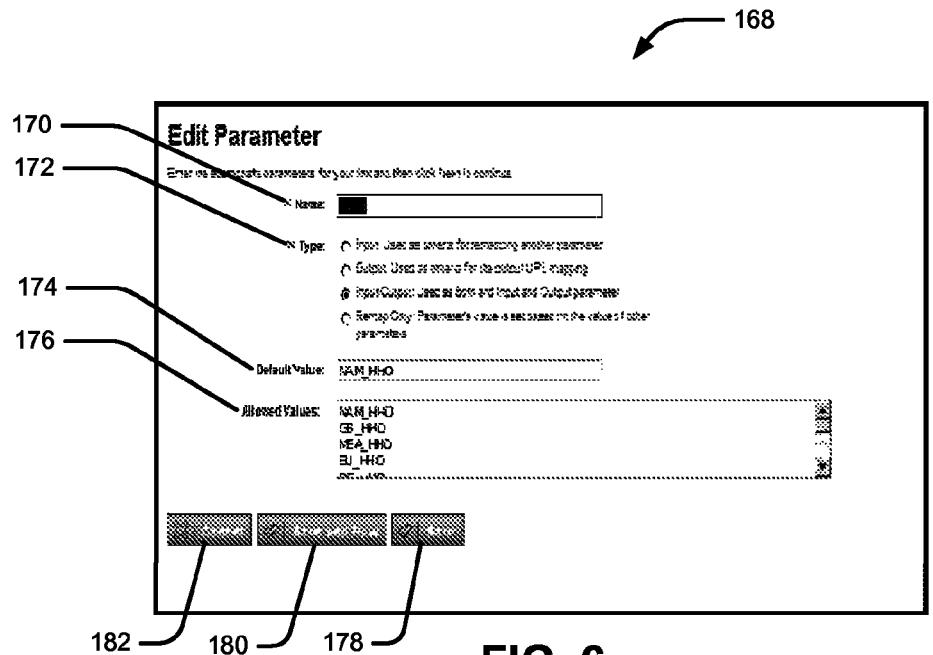
FIG. 6 illustrates an edit parameter page.

FIG. 6 illustrates an edit parameter page 168. Here the user may enter a name 170, type 172, default value 174, and allowed values 176. Under type 172, the user may select the parameter to be an input parameter for use as criteria for remapping another parameter. Also, the user may select output to use the parameter as criteria for output URL mapping. It will be understood by one of ordinary skill in the art that a parameter may be both input and output. Furthermore, the user may select remap only under type 172 to base a parameter's value on the value of other parameters. Once the user is finished with editing a parameter on the edit parameter page 168, they may click save 178, or save and new 180 if they wish to edit another parameter. Clicking cancel 182 abandons editing a parameter.

Figure 7:
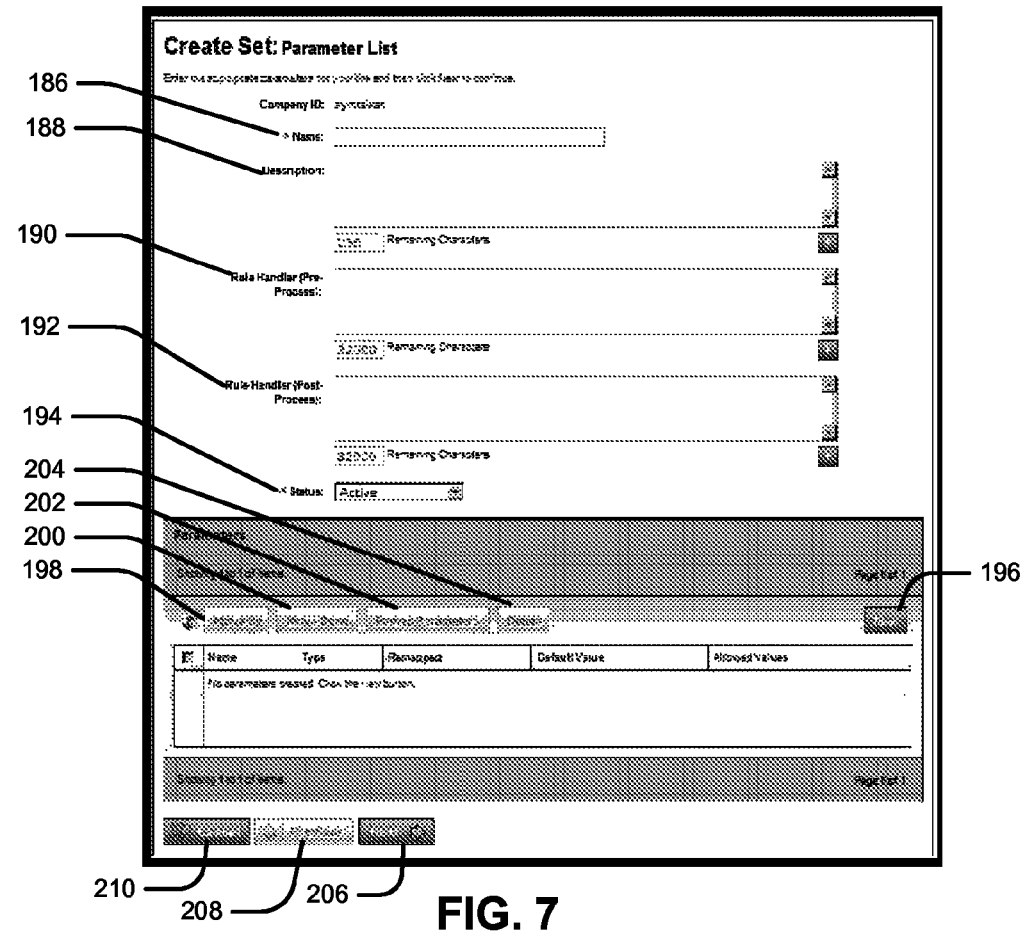
FIG. 7 illustrates a create set page.

FIG. 7 illustrates create a set page 184. In one preferred embodiment, the user may enter a name 186, a description 188, rule handler pre process 190, rule handler post process 192, and a status 194. The parameters as they are created are stored in a parameter list. As described in FIG. 5, the user may click move up 198 and move down 200 to change the weight based values of the parameters.

Remap parameters 202 sends a selected parameter for remapping, and delete 204 removes a parameter from the list. Clicking new 196 allows the user to create a new parameter, shown in FIG. 8 (infra). Also, clicking cancel 210 abandons create a set, clicking previous 208 returns the user to the previous screen, and clicking next 206 sends the user to the next step in the process.

Figure 8:
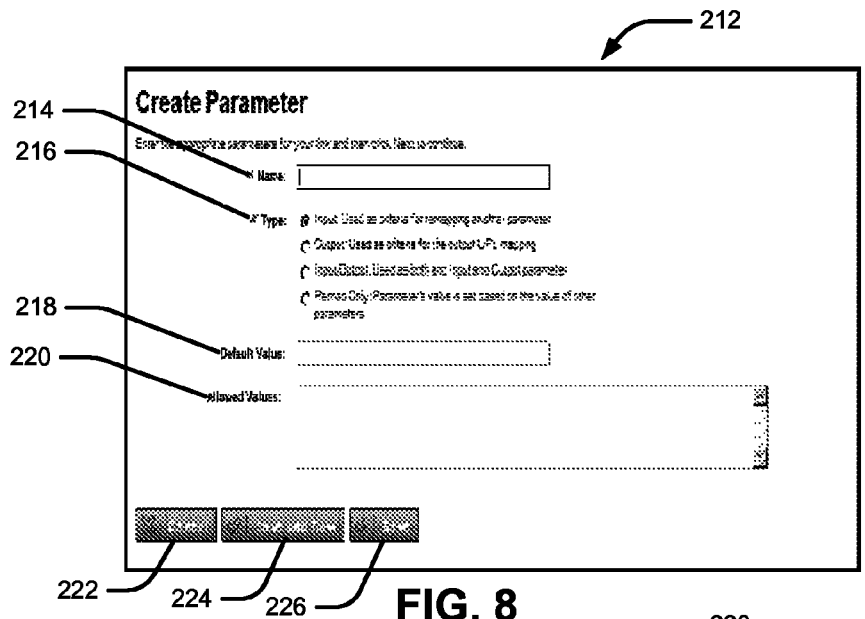
FIG. 8 describes a create parameter page.

Moreover, FIG. 8 describes a create parameter page 212. As with the edit parameter page 168, the user may enter a name 214, type 216, default value 218, and allowed value 220. It will be understood by one of ordinary skill in the art that default value 218 is delineated by line. Once the user is finished with creating a parameter, they may click save 226, or save and new 224 if they wish to create another parameter. Clicking cancel 222 abandons creating a parameter.

Figure 9:
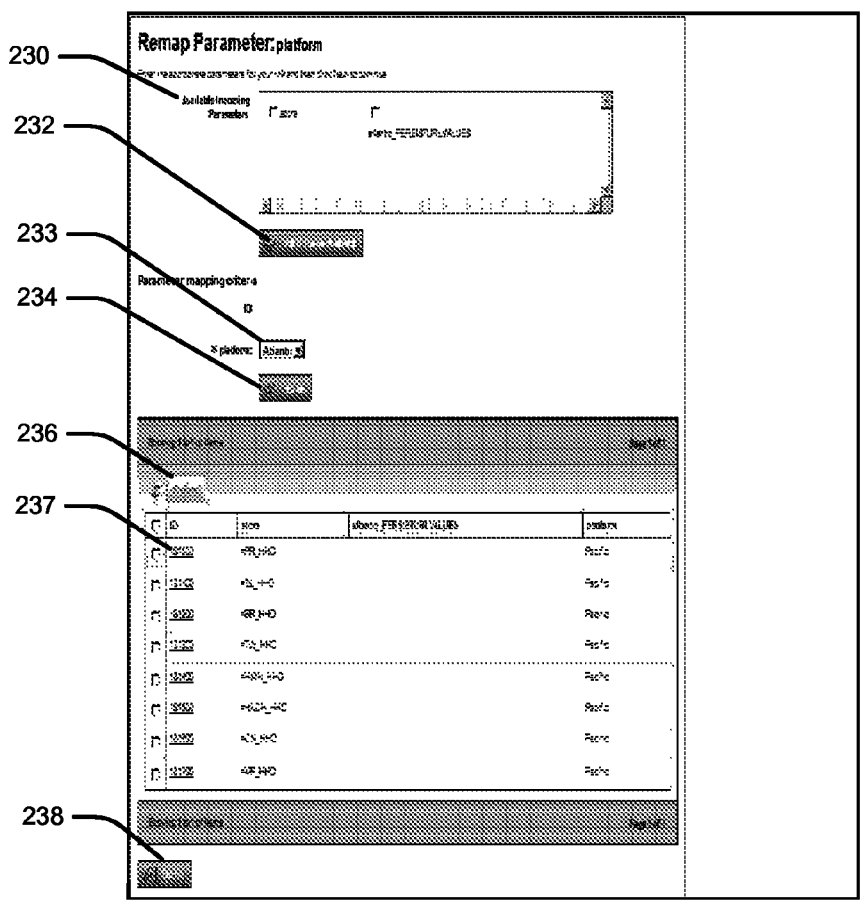
FIG. 9 illustrates a remap parameter screen.
Figure 10:
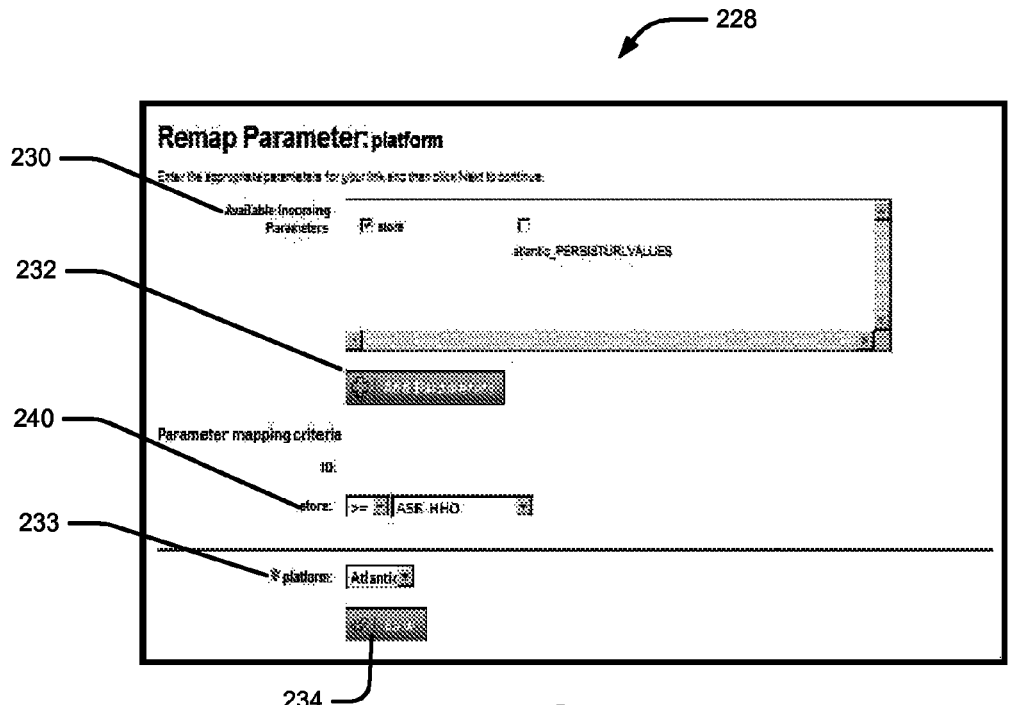
FIG. 10 shows a page for choosing parameter mapping criteria.

Referring to FIG. 9, a remap parameter screen 228 is shown. A user may reach this page by clicking on remap parameters 202 shown in FIGS. 5 and 7. The user may enter the appropriate parameters for a link in this page. Under available incoming parameters 230, the user may select all parameters that are to be included as conditions in the rule that is being created. Any parameters that are defined as input or input/output will appear in this list. The user may choose an e-commerce platform 233 and then save 234 the page. Delete 236 removes a particular remapped parameter from the page and done 238 finishes the remapping process and sends the user back to a previous page. Furthermore, by clicking on an ID 237 of a rule, the user can edit existing rules. By clicking on add parameters 232, the page 228 shown in FIG. 10 appears. Here the user may choose parameter mapping criteria 240.

Figure 11:
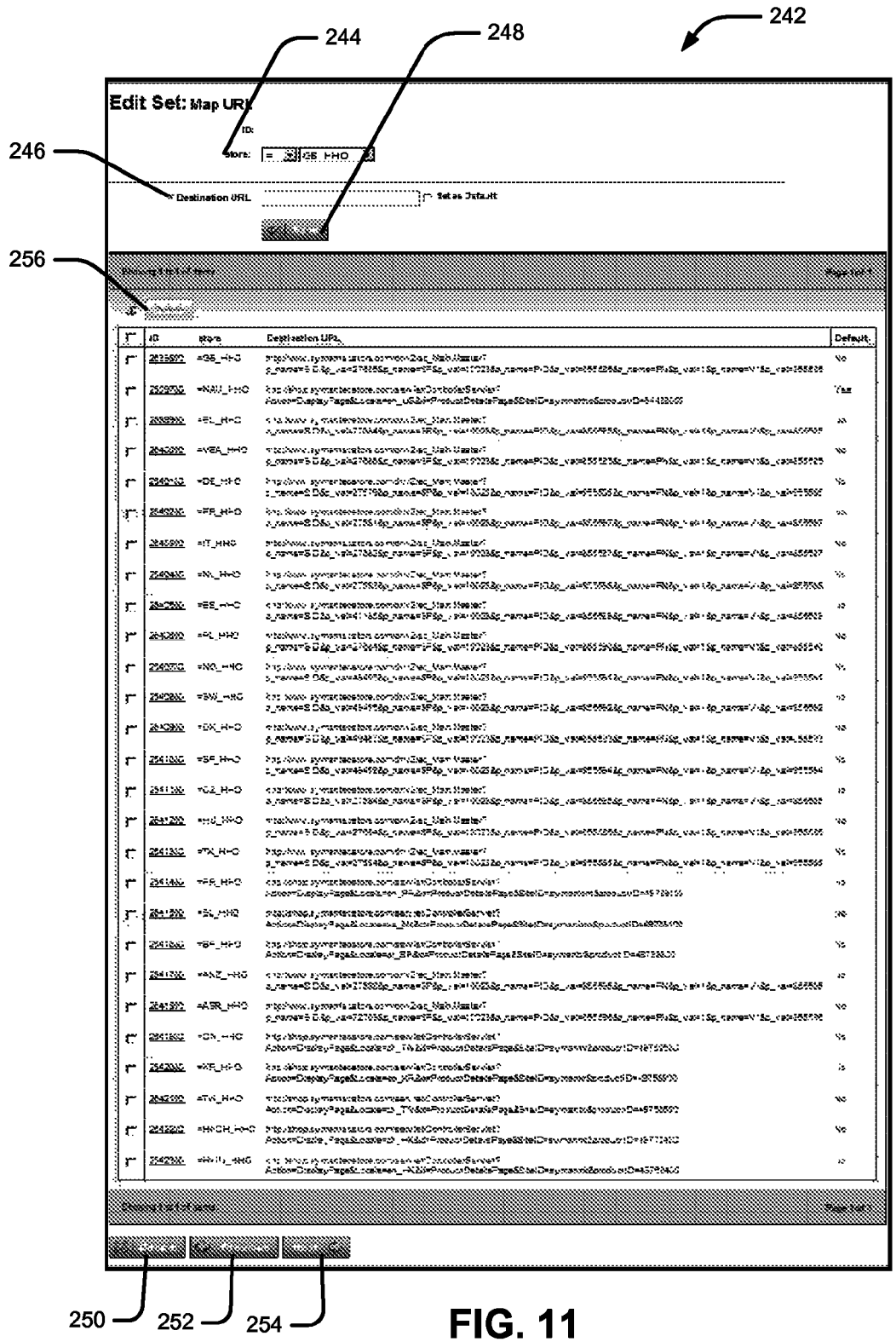
FIG. 11 shows a map URL user interface screen.

FIG. 11 shows a map URL user interface screen 242. In a preferred embodiment, the user may create or edit rules that map the values of selected parameters to a URL which an end web request will be redirected to. The user may select a store ID 244 from a dropdown menu and enter a corresponding destination URL 246. The store ID 244 specifies output parameters, and thus may change depending on what conditions the user chooses (in a previous page). However, the destination URL 246 always remains as a field in this page since that is the ultimate goal of this system (to redirect the user to the destination URL).

Clicking save 248 adds the mapped URL to the list shown in FIG. 11. It will be understood by one of ordinary skill in the art that this screen does not show all possible conditions, and that additional conditions may be added. Clicking delete 256 will remove a mapped URL. Clicking cancel 250 will abandon the action, clicking previous 252 will revert to the previous page, and clicking next 245 will proceed to the next screen.

Figure 12:
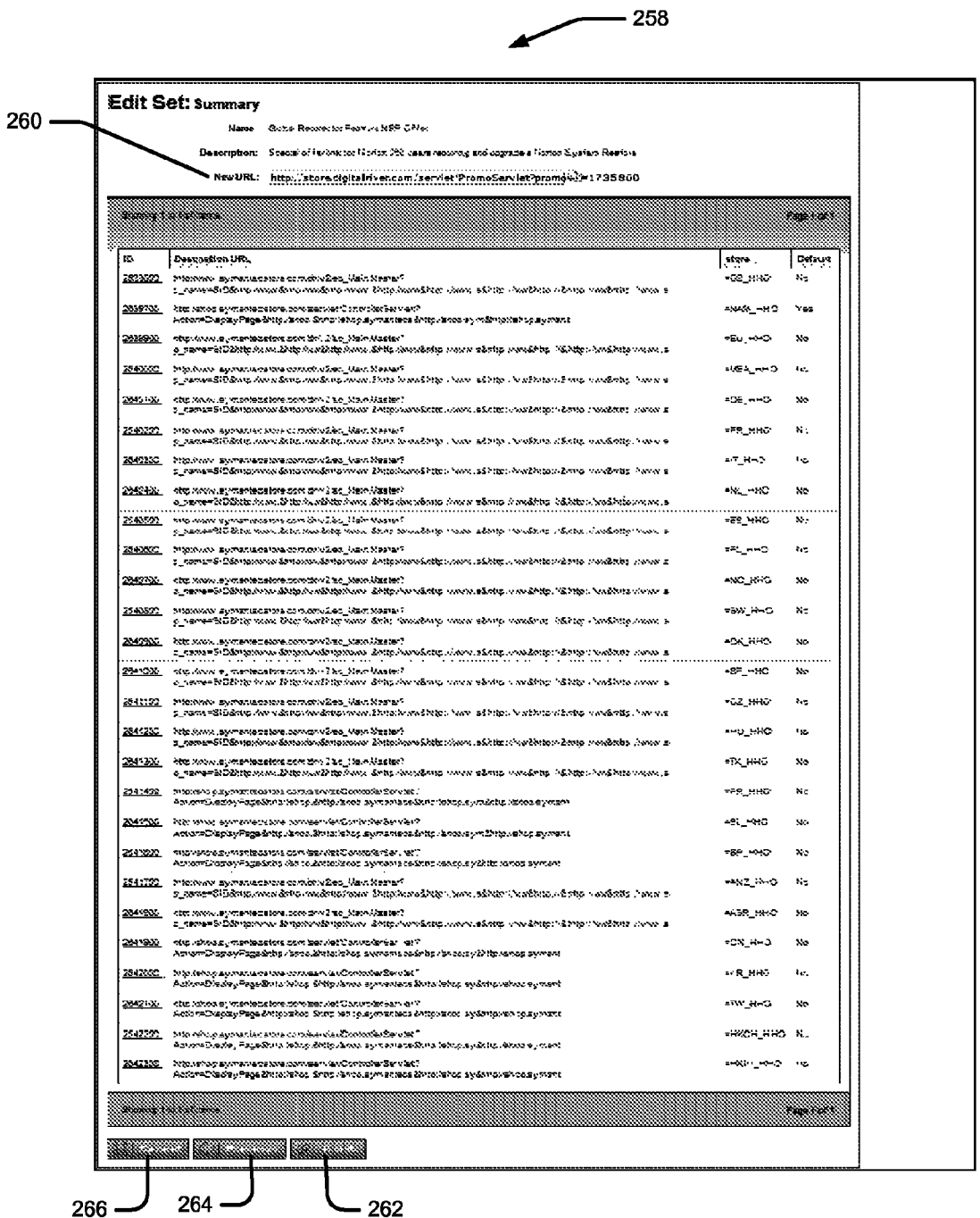
FIG. 12 illustrates a user interface summary screen that outlines the operations performed in prior user interface screens.

FIG. 12 illustrates a user interface summary screen 258 that outlines the operations performed in the prior user interface screens. New URL 260 is the link on a website that would redirect a customer through a rule set. A default column identifies which item will be redirected if no matches are found. Again as in FIG. 11, clicking cancel 266 will abandon the action, clicking previous 264 will revert to the previous page, and clicking finish 262 will complete the action.

Figure 13:
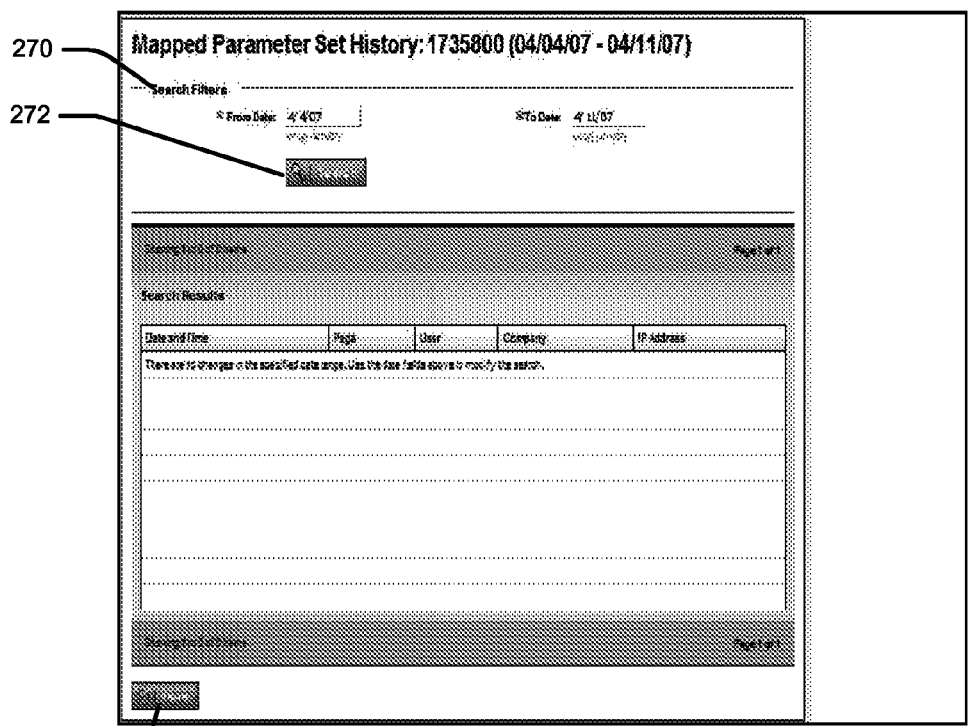
FIG. 13 shows a history screen of date specific operations.

In another preferred embodiment of mapped parameter sets using bulk load tool, the user may view a history 268 of the rules. As shown in FIG. 13, a history screen provides a user with a date range of set history. The user may input search filters 270, and then click search 272. Clicking done 274 finishes viewing the history 268.

Figure 14:
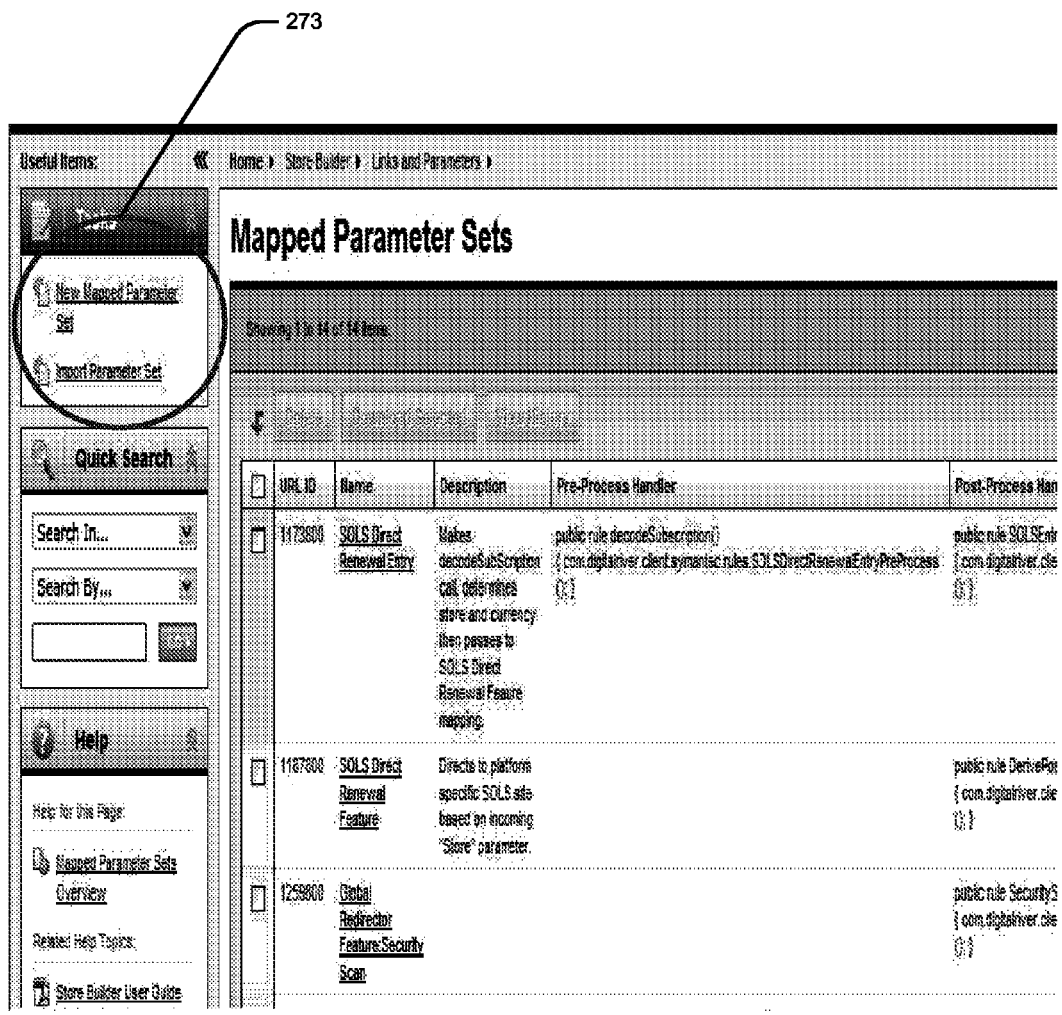
FIG. 14 shows a portion of a mapped parameter set list with a bulk loading tool highlighted.

FIG. 14 shows a portion 273 for the mapped parameter set list with a bulk loading tool highlighted. Here a client or customer may import a parameter set for editing and then may upload the set back to the system. Table 2 describes a sample customizable matrix of the spreadsheet imported from FIG. 14. Here the user may add parameter values to the conditions specified. For example, the conditions may be store type, default value, ID, etc. Furthermore, the matrix may include instructions for the customer or client, such as "Enter values below each column heading. ID column should be left blank for new rules. Enter True in one line of the Default column to set the overriding rule in case multiple rules apply to an incoming URL. If more than one rule is set to TRUE in the Default column, the system will recognize the rule with the highest number as the default rule. Enter "DELETE" in the Delete column to remove a rule from the mapped parameter set." It will be understood by one of ordinary skill in the art that this instruction may be modified. Also, the customizable matrix may include an identifier, such as company information, URL ID, name of the matrix, and time and date of download. A customer or client may enter values below each column heading, such as identification number (ID), store value, destination URL, default type, and delete. There may be more than just one "page" in the customizable matrix, such as a page for remapping a platform. The customer or client may enter values for this varying platform as well. Once the customer or client is finished adding values to the spreadsheet, they may upload the document back to the system.

TABLE 2

Sample customizable matrix for client

| ID | Store | Destination URL | Is Default? |
|---|---|---|---|
| 2639800 | GB_HHO | http://www.symantecstore.com/dr/v2/ec_Main.Master?p_name=SID&p_val=27685&p_name=SP&p_val=10023&p_name=PID&p_val=855585&p_name=PN&p_val=1&p_name=V1&p_val=855585 | FALSE |
| 2639700 | EU_HHO | http://shop.symantecstore.com/servlet/ControllerServlet?Action=DisplayPage&Locale=en_US&id=ProductDetailsPage&SiteID=symnahho&productID=64438000 | TRUE |

TABLE 2-continued

Sample customizable matrix for client

| ID | Store | Destination URL | Is Default? |
|---|---|---|---|
| 2639900 | MEA_HHO | http://www.symantecstore.com/dr/v2/ec_Main.Master?p_name=SID&p_val=27684&p_name=SP&p_val=10023&p_name=PID&p_val=855585&p_name=PN&p_val=1&p_name=V1&p_val=855585 | FALSE |
| 2640000 | DE_HHO | http://www.symantecstore.com/dr/v2/ec_Main.Master?p_name=SID&p_val=27686&p_name=SP&p_val=10023&p_name=PID&p_val=855585&p_name=PN&p_val=1&p_name=V1&p_val=855585 | FALSE |
| 2640100 | FR_HHO | http://www.symantecstore.com/dr/v2/ec_Main.Master?p_name=SID&p_val=27679&p_name=SP&p_val=10023&p_name=PID&p_val=855586&p_name=PN&p_val=1&p_name=V1&p_val=855586 | FALSE |
| 2640200 | IT_HHO | http://www.symantecstore.com/dr/v2/ec_Main.Master?p_name=SID&p_val=27681&p_name=SP&p_val=10023&p_name=PID&p_val=855597&p_name=PN&p_val=1&p_name=V1&p_val=855597 | FALSE |
| 2640300 | NL_HHO | http://www.symantecstore.com/dr/v2/ec_Main.Master?p_name=SID&p_val=27682&p_name=SP&p_val=10023&p_name=PID&p_val=855587&p_name=PN&p_val=1&p_name=V1&p_val=855587 | FALSE |
| 2640500 | PL_HHO | http://www.symantecstore.com/dr/v2/ec_Main.Master?p_name=SID&p_val=41185&p_name=SP&p_val=10023&p_name=PID&p_val=855589&p_name=PN&p_val=1&p_name=V1&p_val=855589 | FALSE |
| 2640600 | NO_HHO | http://www.symantecstore.com/dr/v2/ec_Main.Master?p_name=SID&p_val=27684&p_name=SP&p_val=10023&p_name=PID&p_val=855590&p_name=PN&p_val=1&p_name=V1&p_val=855590 | FALSE |

Figure 15:
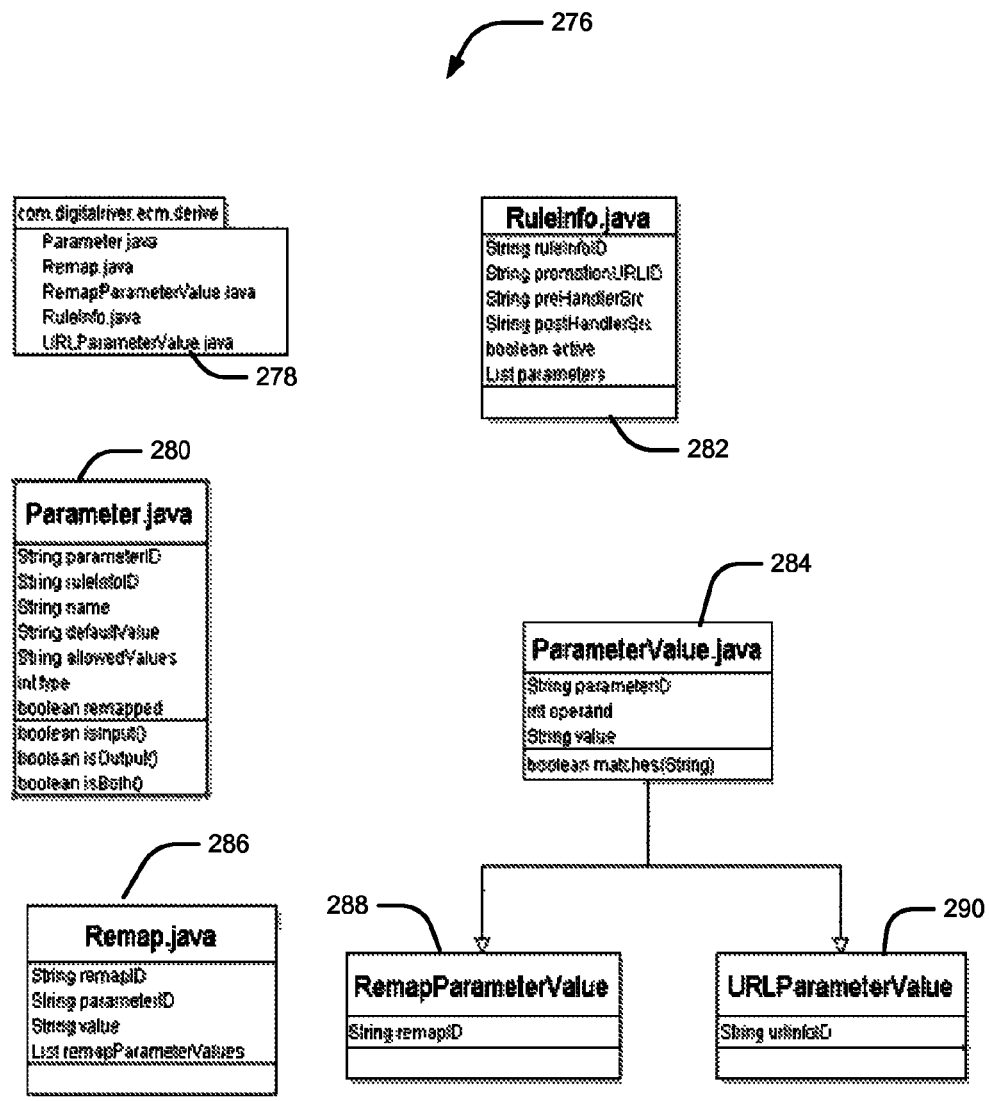
FIG. 15 illustrates a class diagram for an embodiment of mapped parameter sets.

Moving on to FIG. 15, a class diagram is illustrated. Box 278 is a package or framework of items that are listed in code. RuleInfo.java 282 describes a map parameter set or group in general. Moreover, Parameter.java 280 describes basic information about each parameter. Remap.java 286 is an example of one remapping rule. Also, ParameterValue.java 284 describes a value of a parameter as a condition in a specific rule. RemapParameterValue 288 and URLParameterValue 290 are two examples of condition rules. RemapParameterValue 288 is the value of a parameter as a condition of a remap rule, and URLParameterValue 290 is the value of a parameter as a condition of an output URL rule.

Figure 16:
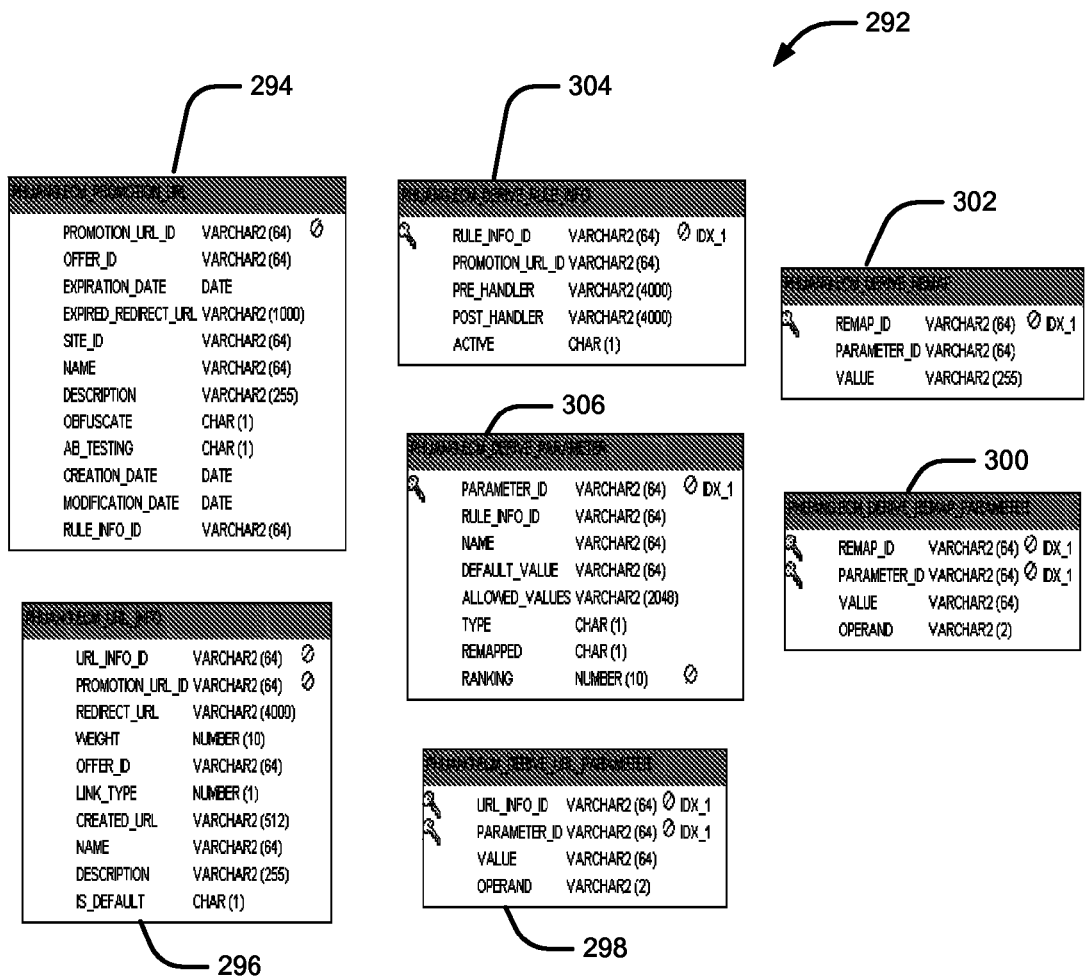
FIG. 16 shows a data model diagram for mapped parameter sets using bulk load upload tool.

Finally, FIG. 16 shows a data model diagram for mapped parameter sets using bulk load upload tool. ECM_PROMOTION_URL 294 shows a framework of mapped parameter sets. These are existing promo servlet applet that the mapped parameter set system may be connected to. ECM_URL_INFO 296 contains URL information. ECM_DERIVE_RULE_INFO 304 contains general information about a set. ECM_DERIVE_PARAMETER 306 contains parameter descriptions. ECM_DERIVE_URL_PARAMETER 298 contains URL parameter values. ECM_DERIVE_REMAP 302 shows remap java rules. ECM_DERIVE_REMAP_PARAMETER 300 shows remapping parameter values.

Use Cases

Tables 3-7 outline use cases for mapped parameter sets using bulk load tool system and method related functions.

TABLE 3

Setup Rule Group

| Information | Details |
|---|---|
| Use case name | Setup Rule Group |
| Summary | User sets up a Rule Group and mapping. |
| Primary actor | User, System |
| Preconditions | The User has the proper User Role to access system functionality and a company is selected. |
| Success guarantees | The User is able to successfully setup a Rule Group and mappings. |
| Trigger | The User selects to "Create Link" under a Link Manager. |
| Basic course of events | 1. System prompts the User to select a Link Type.<br>2. User selects "Derive a resulting URL from incoming parameters" and clicks "Next".<br>3. System displays the Parameter List page with no Parameters listed.<br>4. User enters the Group Name and optional Description, Pre-Process Rule Handler, and Post-Process Rule Handler, and clicks "New" at the top of the Parameter List.<br>5. Proceed to next Use Case |
| Extensions | 4.a.1. User enters the Group Name and optional Description, Pre-Process Rule Handler, and Post-Process Rule Handler, and clicks "Next".<br>4.a.2. System displays an error message stating that one or more Parameters need to be defined for the Rule Group. |

TABLE 4

Add Parameters to Rule Group

| Information | Details |
|---|---|
| Use case name | Add Parameters to Rule Group |
| Summary | User adds Parameters to the Rule Group, defines them as Input, Output, or Both, and optionally defines Allowed Values. |
| Primary actor | User, System |
| Preconditions | A Rule Group has been setup in the system. |
| Success guarantees | The User is able to successfully add Parameters, define them as Input, Output, or Both, and optionally define Allowed Values. |
| Trigger | User Clicks "New" in the Parameter List on the Create Link - Parameter List page. |
| Basic course of events | 1. System displays the Create Parameter page.<br>2. User enters the Parameter Name, Type, optional Default Value, and optional Allowed Values, and clicks "Save".<br>3. System returns the User to the Parameter List page with the newly created Parameter displayed in the Parameter List. |
| Extensions | 2.a.1. User enters the Parameter Name, Type, optional Default Value, and optional Allowed Values, and clicks "Save & New".<br>2.a.2. Repeat steps 1 & 2. |

TABLE 5

Define Order of Precedence of Parameters

| Information | Details |
|---|---|
| Use case name | Define Order of Precedence of Parameters |
| Summary | User defines the order of precedence of defined parameters by changing their order in the Parameter List. |
| Primary actor | User, System |
| Preconditions | A Rule Group and Parameters have been defined. |
| Success guarantees | The User is able to successfully change the order of precedence of the Parameters in the Parameter List |
| Trigger | User reaches the Parameter List page. |
| Basic course of events | 4. User selects the checkbox next to the Parameter they wish to reorder and clicks "Move Up" or "Move Down". <br> 5. System refreshes the page with the selected Parameter adjusted by one row (either up or down). |

TABLE 6

Remap Parameter

| Information | Details |
|---|---|
| Use case name | Remap Parameter |
| Summary | User remaps one or more parameters |
| Primary actor | User, System |
| Preconditions | A Rule Group and Parameters have been defined. The selected Parameter is of the "Output" or "Both" Type. |
| Success guarantees | System displays the Create Link - Parameter List page with a "Yes" in the Remapped Column. |
| Trigger | User navigates to the Parameter List page. |
| Basic course of events | 6. they wish10 User selects the checkbox next to the Output Parameter to remap and clicks "Remap Parameters". <br> 7. System displays the Remap Parameter page with a list of all Input Parameters defined for the Rule Group and the Output Parameter selected on the previous screen. <br> 8. User selects the Input Parameters to remap by selecting their checkboxes and clicks "Add Parameters". <br> 9. System adds the selected Input Parameters to the Parameter Mapping Criteria section. <br> 10. User selects the appropriate operand and enters the appropriate Value for each Input Parameter and clicks "Save". <br> 11. System refreshes the page with the remapped parameters added to the list at the bottom of the page. <br> 12. User clicks "Done". <br> 13. System displays the Create Link - Parameter List page with a "Yes" in the Remapped Column. |
| Extensions | 1.a.1. User selects more than one Parameter and clicks "Remap". <br> 1.a.2. System displays an error message stating that only one Parameter can be remapped at a time. |

TABLE 7

Map URL

| Information | Details |
|---|---|
| Use case name | Map URL |
| Summary | User defines the final URL mapping and completes the setup for a specific Rule Group. |
| Primary actor | User, System |
| Preconditions | The Rule Group and Parameters have been setup and any required remapping has been defined. |
| Success guarantees | The User is able to successfully setup the final URL mapping matrix. |
| Trigger | User clicks "Next" on the Create Link - Parameter List page. |
| Basic course of events | 14. System displays the Map URL page with all of the Output Parameters listed at the top of the page. <br> 15. User selects appropriate operand and enters or selects the appropriate Value for each Output parameter, enters the Destination URL, optionally selects "Set as Default", and clicks "Save". <br> 16. System refreshes the screen with the Parameter Values and Destination URL in the List. <br> 17. User repeats step 2-3 until all Parameter and Value combinations are complete and clicks "Next". <br> 18. System displays the Summary page. User reviews the Summary and clicks "Finish". <br> 19. System saves the final mapping of the Derive Rule Group. |

A further example of a use case may be as follows: The parameter "catID" represents which upsell category the user selected. This, in turn, tells the user which product to upsell. Parameters "spskup" and "spskum" both represent the installed product stock keeping unit (sku). The user uses spskup unless it is null. If it is null, the user would then use spskum. If spskup is null, then the product has not been activated (i.e., it is operating in a trial ware mode). The user will put the value used into a parameter named sku, and base any sku-specific mapping off that parameter.

The upsell product that the client directs the user to is based on the catID that they have selected, but that product (category) could change based on whether the user's product has been activated and also what the existing product on their machine actually is (represented by spefsku).

Given the rules listed above, a rule group would be setup as shown in Table 8.

TABLE 8

Create Parameters (input/output/both)

| | |
|---|---|
| CatID | input |
| locale | both |
| language | both |
| sku | both |
| spefsku | input |
| state | input |
| upsellProduct | output |

Note however, both state and sku are not actual parameters that are passed in the URL. This is an example when a pre-process rule script is used. This rule script populates the sku and state the parameter based on an examination of spskum and spskup parameters.

The next step is to create the remapping for the upsell Product, which is re-named catID. First, the catID is converted to user friendly strings that describe the upsell product. This is useful to pare down the number of rows needed to create the URL mapping table. The name of the catID is changed to "upsell Product". Specified input parameters for upsell Product remapping are: catID, spefsku, and state.

The first mapping rule is that catID 0-2 will point to NIS (internet security upsell) and 3-4 will point to NSW (system works upsell). Five categories have now been condensed into two categories. Having two categories reduces the amount of mapping in the final URL mapping table since the cat_id 0-2 will always point to the same URL.

Further, if the state=inactive, the category will need to be switched to another one. For example, a person who was going to get NSW will now get iNSW, which is system works basic. When a user comes in on a specific spefsku and selects category 3 (NIS), the spefsku indicates that the user already has an NIS product. For example, when this occurs, the category is changed to NSW.

Table 9 is a sample of what that table could look like:

TABLE 9

Sample for specific spefsku

| CatID | State | SpefSku | Output: UpsellProduct |
|---|---|---|---|
| 0 | | | NIS |
| 1 | | | NIS |
| 2 | | | NIS |
| 3 | | | NSW |
| 4 | | | NSW |
| 0 | Inactive | | iNIS |
| 1 | Inactive | | iNIS |
| 2 | Inactive | | iNIS |
| 3 | Inactive | | iNSW |
| 4 | Inactive | | iNSW |
| 3 | | 12345 | NSWE |

The catID has now been remapped into an upsell Product value. A final URL mappings now is able to be created based on the remapped upsell product. A sample of the URL mapping is provided in Table 10. The output parameters have been listed in order of precedence.

TABLE 10

Sample of URL Mapping

| Locale | Language | Upsell Product | Sku | Output: URL |
|---|---|---|---|---|
| HKG | IN | NIS | | Internet Security Detail URL-English |
| HKG | IN | iNIS | | URL for trial ware upsell of internet security-English |
| HKG | IN | NSW | | System works upsell detail URL-English |
| HKG | IN | iNSWE | | URL for trial ware upsell of system works-English |
| HKG | IN | NSWE | | System works essentials upsell detail URL-English |
| HKG | CH | NIS | | Internet Security Detail URL-Chinese |
| HKG | CH | iNIS | | URL for trial ware upsell of internet security-Chinese |
| HKG | CH | NSW | | System works upsell detail URL-Chinese |
| HKG | CH | iNSWE | | URL for trial ware upsell of system works-Chinese |
| HKG | CH | NSWE | | System works essentials upsell detail URL-Chinese |
| HKG | CH | NSWE | 4567895 | Sku level override page for System works essentials upsell detail URL-Chinese |

Technical Solution

Rule processing occurs within a RuleContext; this stores all the parameters of the request, and will also contain the final URL. Once the RuleContext has been populated with the request parameters, the preprocessor rule script is executed, if it has been defined. RuleScript is a proprietary scripting language that is able to parse and execute limited java. A typical use of a pre-processing RuleScript is to validate existence of URL parameters, or do preliminary work to set the value of a parameter in the RuleContext that requires complicated logic or database lookups.

After the preprocessor has completed, parameter remapping is executed. Any parameter that has defined remapping rules will have those rules evaluated. Based on the outcome of that evaluation the parameter's value will be set into the RuleContext. After all necessary parameters have been remapped evaluation of the output URL mappings begins. This operation will result in one URL rule being selected, and that URL will be paced into the RuleContext as the RedirectURL. The application then executes the post-processor rule script if it has been defined. Typical use of this script would be to modify the resulting RedirectURL to append additional parameters discovered at runtime.

Detail of Rule Mapping Evaluations

It will be understood by one of ordinary skill in the art that the logic for evaluating output URL rules and parameter remap rules is essentially the same, comparing a parameter's incoming value (or value in the RuleContext) with the value it requires as a condition of a rule. The logic begins by assuming all rules are applicable candidates for selection. It then selects the parameter that was set as the highest ranking and weight and eliminates all rules that have specified value for that parameter that is not equal to that parameters incoming value.

If at this point only one candidate rule remains, then that rule is selected. If evaluating parameter remapping rules, this means that the parameter is given the value defined by the rule. For example, if param A=1 and param B=2, then param C=3. Furthermore, if evaluating output URL rules, then the result is the redirect URL. For example, if param C=3 and param D=4 then URL=www.testredirect.net.

If no candidate rules remain after the parameter is evaluated then the default value is returned. If evaluating parameter remapping rules, this means that the parameter is given the default value set in the parameter definition. It is possible that the user does not define a default value for a parameter, in which case the parameter is added to the RuleContext with no value.

Moreover, if evaluating output URL rules the application looks to see if the user has marked one rule as the default rule. If they have, that URL is returned as the result. If no default URL has been defined an exception occurs. If more than one candidate rule remains after the parameter evaluation, then the application moves onto the next parameter with the highest remaining rank and weight and evaluates that parameter against the remaining candidates. Again the same rules apply after evaluation. It will be understood by one of ordinary skill in the art that if all parameters have been evaluated, and two or more candidate rules still remain, then tie-breaker policies are put in place.

Some rules can specify no value for a parameter, meaning that parameter can have any value, and the rule will still apply. In an exact match policy, the application examines the remaining candidate rules to determine if any rules have defined a specific value for ALL parameters. This is considered an exact match. Additionally, in rules that contain some wildcard values (no value given meaning any value matches) the application will seek rules that specified a value for the highest weighted parameter. This is considered a best match policy. For example, given the rule context [A=1, B=2, C=3], two candidate rules apply: 1. [A=?(anything) and 2. B=2 and C=3] and [A=1 and B=2 and C=?(anything)]. Both candidates had exact matches with 2 parameters, #1 A/B, #2 B/C. However rule #2 is selected because it had exact matches for higher weighted parameters (A/B) vs. rule #1 which had exact matches with B and C. If rule #2 had a wildcard value for parameter B, thus only having an exact match on A, it would still win, because it matched one higher weighted parameter, although rule #1 matched two lower weighted parameters. Table 11 shows a rule handler example.

TABLE 11

Rule handler example

```
<start rule handler>
// enter any pre-processing scripting here
com.digitalriver.system.derive.determineNewUrl;
// enter any post-processing scripting here
<end rule handler>
Given that template, here is an example
<start rule handler>
// enter any pre-processing scripting here
String state = "ACTIVE";
String sku = request.getParameter("spskuP");
if (StringUtils.isEmpty(sku)){
    sku = request.getParameter("spskuM");
    state = "INACTIVE";
}
// now add new values for input parameters, before processing
request.setAttribute("sku",sku);
request.setAttribute("state", state);
com.digitalriver.system.derive.determineNewUrl;
// enter any post-processing scripting here
//an example
logger.finer("derive is redirecting to..." +
request.getAttribute("deriveUrl"));
<end rule handler>
```

A request attribute named "deriveUrl" will be made available to post handler. Tables 12-16 show a few examples of data in mapped parameter sets, also described in FIG. 16.

TABLE 12

Sample data for ECM_DERIVE_RULE_INFO

| RULE_ INFO_ID | PROMOTION_ URL_ID | PRE_ HANDLER | POST_ HANDLER | ACTIVE |
|---|---|---|---|---|
| 5000 | 87990 | Null | null | 1 |

TABLE 13

Sample Data for ECM DERIVE PARAMETER

| PARAMETER_ID | RULE_INFO_ID | NAME | DEFAULT_VALUE | ALLOWED_VALUES | TYPE | REMAPPED | RANK |
|---|---|---|---|---|---|---|---|
| 5000 | 5000 | catid | null | null | 0 | 0 | 1 |
| 5001 | 5000 | locale | null | null | 2 | 0 | 2 |
| 5002 | 5000 | language | null | null | 2 | 0 | 3 |
| 5003 | 5000 | sku | null | null | 2 | 0 | 4 |
| 5004 | 5000 | spefsku | null | null | 0 | 0 | 5 |
| 5005 | 5000 | state | null | null | 0 | 0 | 6 |
| 5006 | 5000 | upsellProduct | null | null | 1 | 1 | 7 |

TABLE 14

Sample Data for ECM_DERIVE_REMAP

| REMAP_ID | PARAMETER_ID | VALUE |
|---|---|---|
| 5000 | 5006 | NIS |
| 5001 | 5006 | NSW |
| 5002 | 5006 | iNIS |
| 5003 | 5006 | iNSW |
| 5004 | 5006 | NSWE |

TABLE 15

Sample Data for ECM_DERIVE_REMAP_PARAMETER

| REMAP_ID | PARAMETER_ID | VALUE | OPERAND |
|---|---|---|---|
| 5000 | 5000 | 2 | <= |
| 5001 | 5000 | 3 | >= |
| 5002 | 5000 | 2 | <= |
| 5002 | 5005 | Inactive | = |
| 5003 | 5000 | 3 | >= |
| 5003 | 5005 | Inactive | = |
| 5004 | 5000 | 3 | = |
| 5004 | 5004 | 12345 | = |

TABLE 16

Sample Data for ECM_DERIVE_URL_PARAMETER

| URL_INFO_ID | PARAMETER_ID | VALUE | OPERAND |
|---|---|---|---|
| 157490 | 5001 | zh_HK | = |
| 157490 | 5002 | en | = |
| 157490 | 5006 | NIS | = |

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the web interface such that different dialog boxes are presented to a user that are organized or designed differently while maintaining substantially the same functionality without departing from the scope and spirit of the present invention.

What we claim:

1. A Uniform Resource Locator (URL) mapping system for establishing URL mapping rules over a network, the URL mapping rule system being operatively configured such that a link generator can subsequently transform an incoming URL received by a server over the network based on the URL mapping rules to determine a destination URL, the URL mapping rule system, comprising:

a server, comprising:
 a processor; and
 a memory for storing program code;
 a parameter module containing program code which when executed by the processor causes the server to perform operations of storing remapping parameters and associated remapping parameter values in the server memory;
a bulk loading module containing program code which when executed by the processor causes the server to perform operations of allowing a user to populate remapping parameter values by inputting into a previously downloaded parameter set template of the associated remapping parameter values,
a URL mapping rule generator containing program code which when executed by the processor causes the server to perform operations of creating a URL mapping rule from the populated remapping parameter values in the previously downloaded parameter set template and further based on the remapping parameters stored in the server memory by the parameter module; and
a rule handler module comprising program code which when executed by the processor causes the server to perform operations of executing post process specialized business logic after a URL mapping to append additional runtime parameters to the resulting Redirect URL.

2. A system for generating links by utilizing the URL mapping rule system of claim 1 and a link generator that, when operating in the server, transforms an incoming URL received over a network based on URL mapping rules to determine a destination URL.

3. A system for redirecting the incoming URL in a hypertext transfer protocol (HTTP) request message by utilizing the link generator system of claim 2 to redirect an HTTP request to the destination URL based on the URL mapping rules.

4. The system of claim 1 wherein the bulk loading module comprises program code which when executed by the processor in the server causes the server to perform operations of uploading the populated remapping parameter values in the previously downloaded parameter set template back to the server memory.

5. The system of claim 1 further comprising a rule handler module comprising program code which when executed by the processor causes the server to perform operations of executing pre process specialized business logic prior to a URL mapping.

6. The system of claim 2 wherein the link generator comprises program code which when executed by the processor causes the server to perform operations of translating an input parameter and associated input value to an output parameter and an associated output value and redirecting a hypertext transfer protocol (HTTP) request to the destination URL.

7. The system of claim 6 wherein the bulk loading module comprises program code which when executed by the processor in the server causes the server to perform operations of maintaining exclusive multiple groups of mapping rules used by the link generator to redirect the HTTP request to the destination URL.

8. The system of claim 1 further comprising a web based graphic user interface to the bulk loading module.

9. A method for establishing Uniform Resource Locator (URL) mapping rules implemented by a server operable in a network performed by a server having a processor and memory operating under the control of program code within a software module, the method comprising steps performed prior to a step of generating links by transforming an incoming URL received by the server from the network based on the URL mapping rules to determine a destination URL, the steps performed prior to the generating step comprising:

storing remapping parameters and associated remapping parameter values in a parameter library in the server memory;
populating, into the server, remapping parameter values by allowing a user to bulk load input into a previously downloaded parameter set template of the associated remapping parameter values,
creating a URL mapping rule from the populated remapping parameter values in the previously downloaded parameter set template and further based on the remapping parameters stored in the parameter library; and
executing post process step of executing post process specialized business logic after a URL mapping to append additional runtime parameters to the resulting Redirect URL.

10. The method of claim 9 further comprising a step of generating links by transforming an incoming URL from the network based on URL mapping rules to determine a destination URL in the network.

11. The method of claim 10 further comprising a step of redirecting the incoming URL in a hypertext transfer protocol (HTTP) request message by utilizing the generated link.

12. The method of claim 9 further comprising an uploading step of uploading the populated remapping parameter values in the previously downloaded parameter set template back to the parameter library.

13. The method of claim 9 further comprising an executing pre process step of executing pre process specialized business logic prior to a URL mapping.

14. The method of claim 10 wherein the generating step includes translating an input parameter and associated input value to an output parameter and an associated output value and redirecting a hypertext transfer protocol (HTTP) request to the destination URL.

15. The method of claim 14 wherein the populating step includes maintaining exclusive multiple groups of mapping rules used in the generating step to redirect the HTTP request to the destination URL.

16. The method of claim 9 further comprising a step of providing a web based graphic user interface to enable the bulk loading step.

17. A Uniform Resource Locator (URL) mapping system for establishing URL mapping rules over a network, the URL mapping rule system being operatively configured such that a link generator can subsequently transform an incoming URL received by the server over the network based on the URL mapping rules to determine a destination URL, the URL mapping rule system, comprising:
a server, comprising:
a processor;
a memory for storing program code;
a parameter module containing program code which when executed by the processor causes the server to perform operations of storing remapping parameters and associated remapping parameter values in the server memory;
a bulk loading module containing program code which when executed by the processor causes the server to perform operations to populate remapping parameter values by inputting into a previously downloaded parameter set template of the associated remapping parameter values;
a URL mapping rule generator containing program code which when executed by the processor causes the server to perform operations of creating a URL mapping rule from the populated remapping parameter values in the previously downloaded parameter set template and further based on the remapping parameters stored in the server memory by the parameter module; and a rule handler module comprising program code which when executed by the processor causes the server to perform operations of executing post process specialized business logic after a URL mapping to append additional runtime parameters to the resulting Redirect URL.

18. The Uniform Resource Locator (URL) mapping system of claim 17 further comprising a rule handler module comprising program code which when executed by the processor causes the server to perform operations of executing specialized business logic prior to a URL mapping.

* * * * *